No. 890,985. PATENTED JUNE 16, 1908.
D. J. JENNINGS.
PAPER RECEPTACLE.
APPLICATION FILED MAR. 27, 1907.
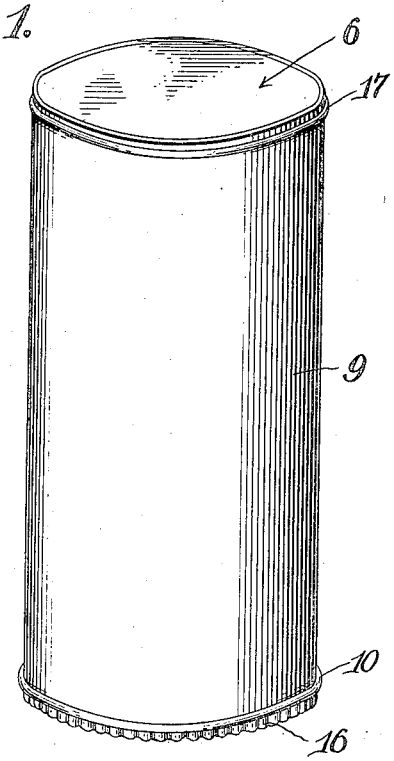
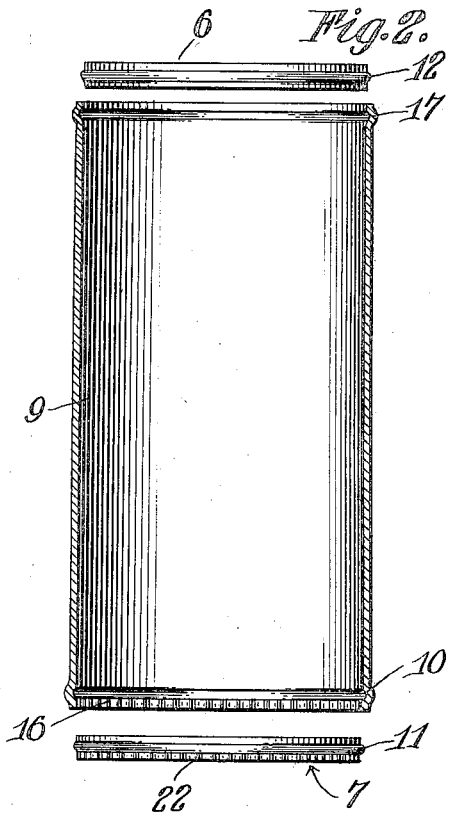
Witnesses
C. E. Smith
Geo. E. Few
Inventor
David J. Jennings
By Milo B. Stevens & Co.
Attorney.

UNITED STATES PATENT OFFICE.

DAVID J. JENNINGS, OF CLEVELAND, OHIO.

PAPER RECEPTACLE.

No. 890,985.  Specification of Letters Patent.  Patented June 16, 1908.

Application filed March 27, 1907. Serial No. 364,806.

*To all whom it may concern:*

Be it known that I, DAVID J. JENNINGS, citizen of the United States, residing at Cleveland, in the county of Cuyahoga and State of Ohio, have invented certain new and useful Improvements in Paper Receptacles, of which the following is a specification.

This invention is a paper receptacle adapted for the carriage and delivery of milk and other fluids.

The object of the invention is to form an improved sanitary and antiseptic vessel which is intended to be used only once and then destroyed, the article being such that it can be manufactured and supplied at a less expense than the cost of supplying glass bottles and cleaning or sterilizing the same after each usage.

The invention comprises a cylindrical vessel made of paper, paste-board or the like and provided with improved means for holding the top and bottom in place and for producing a liquid-tight joint between said top and bottom and the side walls of the vessel.

The invention is illustrated in the accompanying drawings, in which

Figure 1 is a perspective view of the device. Fig. 2 is a central vertical section with the top and bottom detached.

Referring specifically to the drawings, the body 9 of the vessel is a cylinder made of paper, paste-board or the like; and provided with a bottom 7 and a top or cover 6. These parts are coated or saturated with paraffin or similar waxy or oily substance for the purpose of rendering the same impermeable to liquids.

The bottom, 7, consists of a disk of heavy paste-board, cut and pressed to proper shape and provided around its edge with a circumferential rib 11 which fits in the groove of a bead 10 pressed in the lower end of the wall of the body. Below the bead the wall is corrugated as at 16, and the edge of the bottom below the rib 11 is similarly corrugated as at 22, and these corrugations fit together and assist in forming a water-tight joint and in retaining the bottom in place.

The top, 6, consists of a similar disk of heavy paste-board provided with a circumferential rib 12 which fits in a bead 17 near the top of the body. The cover and top end of the body may be corrugated or not, as desired, in a manner similar to the body, but ordinarily the corrugations will be unnecessary.

When the body and the bottom are assembled the edge of the disk 7 is coated with flour paste or similar adhesive substance, and the bottom is then pressed into its seat, where it is held by the adhesive which also closes the joint and prevents leakage therethrough. The cover 6 may if desired be similarly coated around the edge with adhesive, and after the milk or other liquid is placed in the vessel the cover is pressed into place. This forms a liquid-tight vessel well adapted for the delivery of milk and the like and having the advantage over a glass bottle that it will only be used once for the purpose and can then be thrown away. The size and shape may be modified according to choice or necessity.

It will be noticed that the rib is of less width than the thickness of the cover or bottom, so that two shoulders are formed on opposite sides of the rib which contact with the side wall of the receptacle above and below the rib so that a wider and therefore safer joint is formed than if the only point of contact were around the edge of the rib.

I claim:

1. A receptacle having a body and an end piece therefor, the body having a bead around the same, and the end piece comprising a disk having a rib fitting in the groove of the bead, the rib being of less thickness than the width of the disk, forming a shoulder which contacts with the body, said shoulder and the adjacent part of the body having interfitting corrugations which extend at a right angle to the plane of the disk.

2. A receptacle having a cylindrical body provided with a bead near the end thereof and axial corrugations extending around the same beside said bead, and a disk having a rib around the edge, and corrugations formed in the edge of the disk adjacent said rib, the rib and corrugations fitting in said bead and corrugations respectively.

In testimony whereof I affix my signature, in presence of two witnesses.

DAVID J. JENNINGS.

Witnesses:
JOHN A. BOMMHARDT,
SHIRLEY J. BOMMHARDT.